US008917633B2

(12) United States Patent  (10) Patent No.: US 8,917,633 B2
Smith et al.  (45) Date of Patent: Dec. 23, 2014

(54) SYSTEM AND PROCESS FOR MASS TELEPHONY CONFERENCE CALL

(75) Inventors: Rodney A. Smith, Washington, DC (US); Vladimir Smelyansky, Glenview, IL (US); Roman M. Marchevsky, Libertyville, IL (US)

(73) Assignee: Tele-Town Hall, LLC, Arlington, VA (US)

( * ) Notice: Subject to any disclaimer, the term of this patent is extended or adjusted under 35 U.S.C. 154(b) by 82 days.

(21) Appl. No.: 13/064,654

(22) Filed: Apr. 6, 2011

(65) Prior Publication Data

US 2011/0194465 A1  Aug. 11, 2011

Related U.S. Application Data

(63) Continuation of application No. 11/350,194, filed on Feb. 8, 2006, now Pat. No. 7,944,861, which is a continuation-in-part of application No. 10/954,837, filed on Sep. 30, 2004, now Pat. No. 7,852,998.

(60) Provisional application No. 60/510,925, filed on Oct. 14, 2003.

(51) Int. Cl.
*H04L 12/16* (2006.01)
*H04Q 3/00* (2006.01)

(52) U.S. Cl.
CPC ... *H04Q 3/0016* (2013.01); *H04Q 2213/13166* (2013.01); *H04Q 2213/13173* (2013.01); *H04Q 2213/1324* (2013.01); *H04Q 2213/13376* (2013.01)
USPC ........................................................ 370/260

(58) Field of Classification Search
None
See application file for complete search history.

(56) References Cited

U.S. PATENT DOCUMENTS

| | | | |
|---|---|---|---|
| 4,475,189 A | 10/1984 | Herr et al. | |
| 4,796,293 A | 1/1989 | Blinken et al. | |
| 5,440,624 A | 8/1995 | Schoof, II | |
| 5,483,587 A | 1/1996 | Hogan et al. | |
| 5,495,522 A | 2/1996 | Allen et al. | |
| 5,680,392 A | 10/1997 | Semaan | |
| 5,825,858 A | 10/1998 | Shaffer et al. | |
| 5,903,637 A | 5/1999 | Hogan et al. | |
| 5,916,302 A | 6/1999 | Dunn et al. | |
| 5,924,041 A | 7/1999 | Alperovich et al. | |
| 5,953,049 A | 9/1999 | Hornet et al. | |

(Continued)

OTHER PUBLICATIONS

Macker, et al., "IVOX-The Interactive VOice eXchange Application," Naval Research Laboratory, Washington DC, Feb. 20, 1996, 17 pages.

(Continued)

*Primary Examiner* — Dang Ton
*Assistant Examiner* — Ronald h Davis
(74) *Attorney, Agent, or Firm* — Jean C. Edwards, Esq.; Edwards Neils PLLC

(57) ABSTRACT

A method of providing conference call connections includes initiating a conference call between multiple conferees using a conferencing controller, placing each of the multiple conferees in a half-duplex listen only mode using the conferencing controller, and receiving a signal at the conferencing controller from at least one of the multiple conferees to actively participate in the conference call. Active participation can be in the form of asking questions, giving comments, or providing a keypress to vote or provide other information. The conference call can also be broadcast to increase participants. Also, after the conference call is initiated, additional potential conferees can be added.

13 Claims, 11 Drawing Sheets

(56) References Cited

U.S. PATENT DOCUMENTS

| | | | |
|---|---|---|---|
| 5,999,208 A | 12/1999 | McNerney et al. | |
| 5,999,966 A | 12/1999 | McDougall et al. | |
| 6,023,452 A | 2/2000 | Shiragaki | |
| 6,185,194 B1* | 2/2001 | Musk et al. | 370/260 |
| 6,195,357 B1 | 2/2001 | Polcyn | |
| 6,201,859 B1 | 3/2001 | Memhard et al. | |
| 6,275,575 B1 | 8/2001 | Wu | |
| 6,282,278 B1 | 8/2001 | Doganata et al. | |
| 6,332,153 B1 | 12/2001 | Cohen | |
| 6,343,314 B1 | 1/2002 | Ludwig et al. | |
| 6,501,739 B1 | 12/2002 | Cohen | |
| 6,501,740 B1 | 12/2002 | Sun et al. | |
| 6,597,667 B1 | 7/2003 | Cerna | |
| 6,606,305 B1 | 8/2003 | Boyle et al. | |
| 6,741,697 B2 | 5/2004 | Benson et al. | |
| 6,779,030 B1* | 8/2004 | Dugan et al. | 709/223 |
| 6,807,563 B1 | 10/2004 | Christofferson et al. | |
| 6,839,416 B1 | 1/2005 | Shaffer | |
| 6,839,417 B2 | 1/2005 | Weisman et al. | |
| 6,888,925 B2 | 5/2005 | Spitzer et al. | |
| 6,907,449 B2 | 6/2005 | Srinivasan | |
| 6,967,672 B1 | 11/2005 | Huber et al. | |
| 6,996,221 B1 | 2/2006 | Baiyor et al. | |
| 7,006,455 B1 | 2/2006 | Fandrianto et al. | |
| 7,010,622 B1 | 3/2006 | Bauer et al. | |
| 7,107,312 B2 | 9/2006 | Hackbarth et al. | |
| 7,113,512 B1 | 9/2006 | Holmgren et al. | |
| 7,119,828 B1 | 10/2006 | Kizherman et al. | |
| 7,151,753 B2 | 12/2006 | Chaney et al. | |
| 7,257,090 B2 | 8/2007 | Seavers et al. | |
| 7,266,091 B2 | 9/2007 | Singh et al. | |
| 7,277,697 B2 | 10/2007 | Desai et al. | |
| 7,317,791 B2 | 1/2008 | Carlson | |
| 7,330,541 B1 | 2/2008 | Surazski et al. | |
| 7,412,047 B2 | 8/2008 | Nguyen et al. | |
| 7,454,460 B2 | 11/2008 | Ivashin | |
| 7,483,400 B2 | 1/2009 | Kuusinen et al. | |
| 7,483,526 B2 | 1/2009 | Keohane et al. | |
| 7,580,375 B1 | 8/2009 | Friedrich et al. | |
| 8,094,788 B1* | 1/2012 | Eberle et al. | 379/88.12 |
| 2002/0118808 A1 | 8/2002 | Kelleher et al. | |
| 2002/0181686 A1 | 12/2002 | Howard et al. | |
| 2003/0021400 A1 | 1/2003 | Grandgent et al. | |
| 2003/0055899 A1 | 3/2003 | Burger et al. | |
| 2003/0074444 A1 | 4/2003 | Ahrens, Jr. et al. | |
| 2003/0108002 A1* | 6/2003 | Chaney et al. | 370/261 |
| 2003/0129956 A1* | 7/2003 | Virolainen | 455/306 |
| 2003/0163526 A1 | 8/2003 | Clarisse et al. | |
| 2003/0182374 A1 | 9/2003 | Haldar | |
| 2004/0001446 A1* | 1/2004 | Bhatia et al. | 370/261 |
| 2004/0047460 A1* | 3/2004 | Adams et al. | 379/202.01 |
| 2004/0047461 A1 | 3/2004 | Weisman et al. | |
| 2004/0080504 A1 | 4/2004 | Salesky et al. | |
| 2004/0086093 A1 | 5/2004 | Schranz | |
| 2004/0101119 A1 | 5/2004 | Malcolm et al. | |
| 2004/0107255 A1 | 6/2004 | Ludwig et al. | |
| 2004/0119814 A1 | 6/2004 | Clisham et al. | |
| 2004/0125933 A1 | 7/2004 | Jun et al. | |
| 2004/0141606 A1* | 7/2004 | Torvinen | 379/202.01 |
| 2004/0203977 A1* | 10/2004 | Kennedy | 455/518 |
| 2004/0218744 A1 | 11/2004 | Nguyen et al. | |
| 2004/0228292 A1 | 11/2004 | Edwards | |
| 2005/0018826 A1 | 1/2005 | Benco et al. | |
| 2005/0034079 A1 | 2/2005 | Gunasekar et al. | |
| 2005/0135279 A1 | 6/2005 | Zabawskyj | |
| 2005/0207357 A1 | 9/2005 | Koga | |
| 2006/0067250 A1 | 3/2006 | Boyer et al. | |
| 2006/0067499 A1 | 3/2006 | Oliveira et al. | |
| 2006/0189337 A1 | 8/2006 | Farrill et al. | |
| 2006/0239212 A1 | 10/2006 | Pirzada et al. | |
| 2006/0274675 A1 | 12/2006 | Kizhnerman | |
| 2006/0293073 A1 | 12/2006 | Rengaraju et al. | |
| 2007/0121859 A1 | 5/2007 | Smelyansky et al. | |
| 2007/0294263 A1 | 12/2007 | Punj et al. | |
| 2009/0060157 A1 | 3/2009 | Kim et al. | |

OTHER PUBLICATIONS

Yocom et al., "Large IP-PBXs: A Well-matched Quartet," Business Communications Review; Jan. 2004; 34,1; ProQuest Technology Collection, pp. 26-40.

* cited by examiner

SYSTEM AND PROCESS FOR MASS TELEPHONY CONFERENCE CALL

CROSS-REFERENCE TO RELATED APPLICATIONS

This application is a continuation application of U.S. patent application Ser. No. 11/350,194, filed Feb. 8, 2006 now U.S. Pat. No. 7,944,861, which is a continuation-in-part of U.S. patent application Ser. No. 10/954,837 filed Sep. 30, 2004 now U.S. Pat. No. 7,852,998, which claims priority from U.S. Provisional Application No. 60/510,925 filed Oct. 14, 2003, the contents of all of which are herein incorporated by reference in their entirety.

TECHNICAL FIELD

This invention relates generally to telephony systems. More particularly the invention relates to a system and method for initiating and controlling conference calls through any telecommunications or media system.

BACKGROUND OF THE INVENTION

The disclosure of this invention will focus on its application in the traditional telephone system. This is done for the sake of clarity and brevity, since describing the application of this invention in each of the other telecommunication systems would be needlessly tedious. It will become clear to a person reasonably skilled in this art that the methods described in this disclosure can be applied similarly to any communication system, including wireless communication systems including those using radio connections.

Several methods are currently in use for establishing a telephone conference call. These include:
1. Prearrange a time when each conferee will dial a specified phone number to join a conference call. At the prearranged time, as each conferee makes a connection to the specified phone number, they are automatically joined to a conference call that is already operational before any conferees have joined.
2. A call administrator manually dials each target conferee, placing each contacted conferee on hold while attempting to contact the remainder of the target conferees. Then, when all conferees have been contacted, the call administrator causes them all to be simultaneously bridged into the conference call via features available in a local PBX or telephony switch system.
3. A method described in 2 above, wherein a computerized system replaces the call administrator, performing the same functions automatically.

In method 1 (above), the process is semi-coordinated in that a prearranged time is used as a target connection time for each conferee. One problem with this approach is that it relies on the conferees to remember the exact prearranged time of the call. It also relies on the expectation that each of the conferees will initiate their connection to the conference call at the same time (any delay by one or more conferees to initiate dialing will delay the effective start time of the conference call). This approach also assumes that all of the target conferees' time clocks are precisely synchronized (even a few minutes of difference between clocks can delay the effective start time of the conference call). Another disadvantage of this approach is that, intentionally or unintentionally, uninvited participants can be connected into the conference call at any time during the call. One advantage to this approach is that the process of initiating the conference call is parallel in nature. This can reduce the amount of time required to connect all of the conferees to the conference call. Unfortunately, this approach's parallel activity is uncoordinated and relies on the memories and attentiveness of each of the target conferees. Thus, problems remain with this approach.

In method 2 (above), the manual process of serially dialing even a few conferees is tedious, time consuming and error prone. If a significant number of conferees are included, this process becomes completely impractical due to the amount of time required to contact the entire list of conferees before the conference call can start. One benefit of having a person manually dial each of the target conferees is that the person has the ability to detect and correct errors on the conferee list (wrong or disconnected phone number, etc.). This person can also determine in real time whether the correct person has answered the phone, whether or not an answering machine or voicemail has been reached, whether the connection time has become unreasonable or unusually long and, finally, whether or not the target conferee accepts the invitation to the conference call. Another advantage of having a person manually dial each target conferee is that the person can redial the conferee if their connection is lost and it is known that the conferee wishes to continue to participate in the conference call. Thus, problems remain with this approach.

In method 3 (above), the automation of the dialing process removes the tedious dialing task from a human, and reduces the time required to contact the entire list of conferees. However, the dialup process is still serial, thereby incurring the unavoidable accumulation of delays associated with contacting each conferee.

Many systems exist for automatically initiating and controlling conference calls. Even the most automated of these systems, however, invariably uses the same basic process to initiate a conference call. The basic process includes the serial steps of:
1. Dialing a conferee (from among those found on a list of target conferees).
2. If contact is made with the target conferee, making a connection between that conferee and the pending conference call.
3. After these first steps are completed, the process is repeated for the next conferee on the list.

This continues until all of the target conferees have been contacted and connected to the conference call. At this point, the conference call can begin.

As described below, this serial dialup process has several disadvantages.

The first disadvantage of the serial dialup process is that the conference call is stalled (with participants waiting on hold) while the remaining conferees are being connected to the call. Since the time required for each connection to a conferee may be several seconds (typically 5 or 6 seconds before the dialed number even begins ringing), when the quantity of conferees exceeds 20 the conferee who was contacted first is required to wait up to 2 minutes before the call becomes operational. This may seem insignificant, but as the quantity of conferees rises, the delay associated with contacting all of the conferees rises proportionally. When a massive list of conferees is used (as occurs when a conference call is used to disseminate a corporate announcement), this delay becomes burdensome. For instance, if a conference call is intended to reach 5000 employees of a company, the cumulative connection delay could exceed 7 hours (assuming an average connection time of 5 seconds per conferee). This makes the serial dialup approach impractical for this application (or any other mass telephony conference application).

A second disadvantage of existing conference call initiation processes is that statistics are not kept that can be used to make subsequent conference calls to the same conferees more efficient. For instance, if a target conferee changes their phone number, time is wasted unsuccessfully attempting to contact them at their old phone number. Not only does this waste time and resources, it can potentially annoy someone who has since acquired the old phone number.

Yet another disadvantage of existing conference call initiation systems is the inherent risk of using a single dial-out source (telephony switch or PBX). Should this switch fail (or its connections to the PSTN fail), the successful completion of the conference call becomes impossible.

Another significant disadvantage of current conference call initiation systems is that there is no mechanism for determining whether a conferee, who has disconnected from the conference call in progress, desires to be reconnected to the call.

From this explanation it can be seen that a method and article are needed for reducing the amount of time required to connect an entire list of target conferees to a conference call. It can also be seen that there is a need for a conference call system that is not vulnerable to a failure of a single telephony switch or that switch's network connections. Further, it can be seen that there is a need for a conference call system that automatically gathers and analyzes statistics of a conference call in order to improve the efficiency of the conference call initiation process for subsequent conference calls. It can also be seen that there is a need for a conferencing control system that can determine whether a connection should be joined to the conference call based on predefined parameters and detected conditions. It can finally be seen that there is a need for a conferencing control system that can determine whether a disconnected conferee should be reconnected to the conference call by either automatically out dialing to the conferee, or by allowing the conferee to dial a predefined phone number, and after being revalidated, be reconnected to the call.

SUMMARY OF THE INVENTION

Accordingly, it is an object, feature, or advantage of the present invention to provide a method for dramatically reducing the time required to notify a group of target conferees and incorporate them into a conference call.

It is another object, feature, or advantage of this invention to provide a method and article for initiating a conference call, wherein the process includes allowing a target conferee to validate that they are the appropriate party, then accept or reject an invitation to a conference call, the response of the target conferee being recorded and later used (along with other factors) to determine whether that conferee should be auto-reconnected or allowed to reconnect to an ongoing conference call when connection has been lost to that conferee.

It is yet another object, feature, or advantage of the invention to provide an article and method for automatically redialing a conference call participant who has been disconnected, yet has indicated a desire to participate in the entire conference call. This object also includes the ability of the invention to detect a predefined disconnect signal from a conferee, the signal indicating that the conferee chooses to voluntarily disconnect from an ongoing conference call, thus indicating that the conferee should not be automatically reconnected to the ongoing call.

It is also an object, feature, or advantage of the invention to provide an article and method for preventing call answering automation systems from becoming connected to a conference call, as well as for preventing uninvited parties from joining a conference call.

It is yet another object, feature or advantage of the invention to provide a conferencing controller that automatically detects a connection failure that is due to busy signals, "telephone number changed" or "telephone number disconnected" (or similar) messages when attempting to connect to a specific target conferee. This conferencing controller then records this information in association with the specific target conferee to prevent further attempts to connect to the same target conferee via the same contact phone number or digital address, and alerts the conferencing controller's users that this specific target conferee's contact information should be updated.

It is further an object, feature, or advantage of this invention to provide an article and method for automatically storing conference call activity statistics, such as call initiation start time, operational conference call start and end times, individual conferee connection and disconnect times, the telecommunications resources associated with each conferee's connection, any failures associated with attempting to contact each conferee, along with many other useful statistics.

An additional object, feature or advantage of the invention is to provide a method for automatically analyzing these gathered statistics to establish decision-making criteria that can be used to increase the efficiency, coordination and speed of subsequent attempts to contact conferees.

It is additionally an object of the invention to provide an article and method that makes statistical system performance data available to external processes for analysis and billing purposes.

It is another object of the present invention to provide an article and method for reducing vulnerability to a single point of failure in the available telephony resources.

A further object, feature, or advantage of the present invention is to provide for playing a message and using an auto operator to allow an attendee to a teleconference to join the conference call.

A still further object, feature, or advantage of the present invention is to provide the ability for an attendee on a conference call to indicate that they wish to be placed in a queue to ask a question.

Yet another object, feature, or advantage of the present invention is to provide for continuous dialing.

A still further object, feature, or advantage of the present invention is to provide a system and process for mass conference calls that can be used in the context of radio connections.

Another object, feature, or advantage of the present invention is to allow participants in a conference call to actively participate through providing one or more keypresses in response to a poll.

Yet another object, feature, or advantage of the present invention is to allow additional participation in a conference call through broadcasting of the conference call such as over radio or a computer network.

A further object, feature, or advantage of the present invention is to provide for initiating connections with additional conferees after the conference call has begun.

One or more of these and/or other objects, features and advantages are obtained in a teleconferencing control system that can be positioned in any location that provides connectivity to selected telephony resources either via the Internet or other data to communications networks. This teleconferencing control system stores a list of target conferees' contact phone numbers and/or digital connection addresses. When a conference call is initiated by this teleconferencing control system, a computer, using an intelligent, coordinated, parallel distributed dialing approach, having controlling access to multiple parallel telephony resources, selectively assigns available telephony resources for each out dial to a target conferee (this selection is based on the phone number or digital address of the target conferee, the location of the target telecommunications device, system load-balancing requirements, the known quality of the selected telephony resources and the predicted connection delay known to be associated with the selected telephony resources).

In a preferred embodiment of the invention, the teleconferencing control system comprises a data network server computer that will host the conference call, handling inter-conferee information exchange in the digital domain. This data network server, in the preferred configuration, is connected in parallel through multiple data networks to multiple voice-over-Internet protocol (VoIP) telephony gateways (though a single data path to a single VoIP gateway will suffice). This teleconferencing control system stores a list of target conferees for each conference call, instigating a simultaneous, parallel, distributed out dialing of the target conferees upon detection of a manual trigger, or automatically at a predefined time or upon detection of a set of specified trigger conditions.

This teleconferencing control system, for each conferee on the list, initiates a connection attempt through selected telephony resources. Instead of waiting for connection to a conferee before proceeding (as is currently done in the art), the present invention, in a parallel fashion through multiple telephony resources, initiates the dialing of multiple conferees simultaneously. Preferably, connection attempts to all target conferees are started at precisely the same time, or with a coordinated timing that is automatically adjusted per target conferee to account for variations in known connection delays associated with selected telephony resources. In this manner, the entire target conferee base is connected substantially simultaneously to the conference call. It is to be understood that connecting substantially simultaneous or substantially at the same time does not require that the connection, be made at the exact and precise time, but rather such that it appears to be simultaneous or substantially simultaneous to the conferees. The terms "simultaneous" and "substantially simultaneous" exclude sequential attempts to connect.

The selection of the telecommunications resources to use for out dialing a given conferee is determined based on an algorithm that factors in:
1. The location of the conferee's phone.
2. The predicted telephony resource loading.
3. The costs associated with the selected connection route.
4. The type of system through which the conferee will be connected.
   a. PSTN voice telephony system.
   b. Video conferencing system.
   c. Voice over Internet protocol (VoW) system.
   d. Wireless versus wireline system.
5. Statistical connection speed performance histories of available telecommunications resources and routes.
6. Statistical quality performance histories of available telecommunications resources and routes.
7. In the case of VoIP connections, the statistical quality performance histories of available network servers and services.

A significant advantage of this approach over prior art is that when a conference call is initiated, the amount of time required to contact each of the target conferees, and to finally connect all conferees together for the call is dramatically reduced. In addition, since the out dialing of each conferee is done through a selected telecommunications resource (from among a plurality of available resources), the probability of providing a best-quality and least expensive conference call is improved. Also, since more than a single route is available for contacting conferees, the possibility of a conference call (or portions thereof) being blocked due to call traffic overloading or failure of telephone system resources is reduced.

Since dialing multiple conferees can be done in a parallel manner, there is no requirement for the teleconferencing system to endure the delays inherent with serial dialing through a single telecommunications resource. This is significant because the call setup and connection process for existing telecommunications systems has a lower limit in terms of completion time. This is due to current telecommunications system design, which to requires that a telecommunications switch receive a signal or message from the call initiator, which takes a finite period of time to accomplish, followed by further required signaling between the initial switch and a distant switch (which may directly ring a targeted telephone, or require connection through one or more other switches before a connection can be made to the target telephone). Each link through a telecommunications switch will add some minimum additional amount of processing time to the call connection process.

If the teleconferencing controller must wait for connection to each target conferee before out dialing to the next conferee on the list, the delays associated with each connection attempt are serialized, thereby creating a situation where, predictably, the more target conferees there are, the longer it will take to notify the entire conferee base and get them all simultaneously connected into the call.

In the present invention, the conferees are simultaneously out dialed through multiple telephony resources in at least a partially parallel manner. This means that, in the best case where each conferee is dialed through a separate telephony resource, the connection of all of the conferees to the conference call is completed when the slowest connection is completed. A simple calculation shows that this significantly reduces the overall time required to establish an operational conference call.

For Example:

A conference call is initiated by a prior art conference call setup method by serially dialing each of 100 conferees to establish their connection to the call. Assuming an average call connection time of 6 seconds for each conferee, the conference call becomes fully operational after 600 seconds (10 minutes). In contrast, a conference call set up using the method disclosed in the present invention, using 100 separate telecommunications switches for out dialing to the conferees (one switch per conferee), the conference call would be fully operational after only 6 seconds. This provides a dramatic reduction in the conference call setup time.

Considering the amount of time a conferee must wait (on hold) for a conference call to start using the prior art setup method, there is a notable benefit to the conferee in using the method of the present invention, since the on-hold time is nearly eliminated (in some scenarios, the on-hold time is eliminated entirely).

In an alternate embodiment of the invention, a teleconferencing controller can eliminate the need for an intermediate protocol conversion of the voice and data signaling. In this embodiment, the conferencing controller does not host the conference call, but rather connects all of the participating conferees to an external conference hosting system. This alternate embodiment of the invention is configured in a way that allows the conferencing controller to have direct controlling access to telephony switches, causing the switches to out dial to the conferees in a coordinated, parallel manner. The conferencing controller can either command the telephony switch to connect the conferees to a specified telephone number (a conference in progress or about to begin), or can command the telephony switch to access a local conference call setup list that specifies the dial out effort parameters.

In another alternate embodiment of the present invention, the conferencing controller maintains a cross-reference list that identifies conference call "groups." When a conference call is triggered for an identified group, the group identifier is used to determine which telephony switch(es) or VoIP gateway server(s) should be engaged to assist in initiating the call. Each of the selected switch(es) or VoIP gateway server(s) contains a local cross-reference list that associates a group identifier with the task of making connection to one or more locally listed conferees. The conferencing controller of this embodiment of the invention sends each selected switch or VoIP gateway a signal or message that identifies a specific conferee group, allowing that switch or VoIP gateway to handle the parallel out dialing of the conferees contained in a localized list. This further distributes the dial out effort and reduces the communication bandwidth required for communicating the dial out information to the selected telephony resources, thus reducing the overall time required to set up a conference call.

In a further alternative embodiment, the present invention can be implemented as a telephony switch-internal configuration, where the parallel out dialing logic is contained and operated within the telephony switch, and the switch's internal conferencing resources are used.

According to another aspect of the present invention a method of providing conference call connections includes initiating a conference call between multiple conferees using a conferencing controller, placing each of the multiple conferees in a half-duplex listen only mode using the conferencing controller, and receiving a signal at the conferencing controller from at least one of the multiple conferees to request active participation in the conference call. The signal can be a keypress in response to a prompt for an active response, a keypress to request switching to a full-duplex listen and talk mode. One or more of the conferees can then be switched to the full-duplex listen and talk mode such as to ask questions or provide comments. The conferees requesting active participation are preferably placed in a queue and a prompt is individually given to the conferee before the switching occurs so that they know that they are active.

According to another aspect of the present invention, a method for conferencing that reduces conference call setup time by simultaneously out dialing to multiple selected conferees through a plurality of parallel communications resources in provided. The method includes substantially simultaneously initiating connection attempts to a plurality of the multiple selected conferences, wherein at least two of the connection attempts are routed through separate available parallel communications connection resources. For each connection attempt resulting in an answered call, a determination is made as to whether the answered call is answered by a person, a fax machine, or an answering machine. If answered call is answered by a person playing an invitation to the conference call. If the answered call is answered by a fax machine, the connection attempt is ended. If the answered call is answered by an answering machine, then a message is recorded or the connection attempt is ended. The present invention provides for continuing to initiate connections during the conference call. In addition, the conference call can be broadcast such as over the radio or over a computer network.

DETAILED DESCRIPTION OF THE PREFERRED EMBODIMENT

Figure 1:
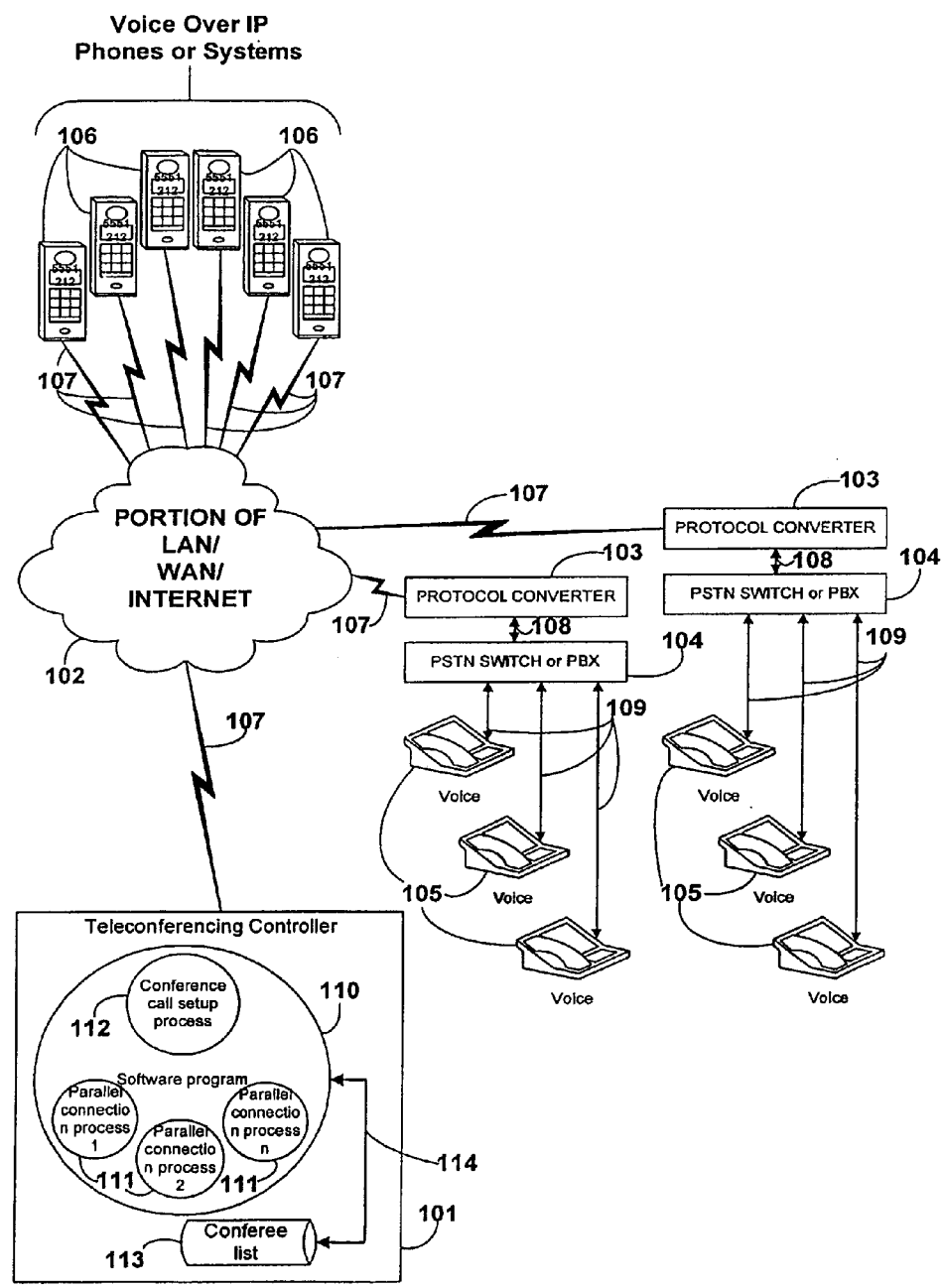
FIG. 1 is a simplified block diagram of the preferred embodiment of the system hardware architecture of the invention as it interconnects to existing telephony systems.

Referring to the drawings, a preferred embodiment of the invention will be described. First, the overall hardware architecture and connections will be described, following which will be a description of the operation of the software which controls the invention's hardware and processes. The specific embodiments set forth herein are merely representative of the present invention and the present invention is not to be limited to these specific embodiments.

Conferencing System Hardware High-level Architecture

It can be seen that in the preferred embodiment of the invention, there is an architecture that at least partially includes the elements shown in FIG. 1 of the drawings.

Now referring to FIG. 1 of the drawings, it can be seen that there is a software program 110 operating to control teleconferencing controller 101. Software program 110 contains conference call setup process 112, which is triggered when software program 110 detects a condition indicating that a conference call should be started. Additionally, software program 110 controls the existence and operation of all of n instances of parallel connection process 111. Available for access by software program 110 operating (and preferably residing within teleconferencing controller 101) is conferee list 113. Communications between software program 110 and conferee list 113 occurs through communications path 114.

Teleconferencing controller 101 is connected to, and communicates with, a portion of a LAN/WAN/INTERNET 102 network through a data network using a "voice-over-internet-protocol" (VoIP), or similar protocol via data network path 107. Note that, while only a single connection is shown in FIG. 1 for the sake of simplification, in actual practice, for the sake of redundancy and efficiency, one or more additional parallel connections are typically used to connect these two entities.

It can also be seen in FIG. 1 that a plurality of VoIP phones or systems 106 may be connected, each through a data network path 107, to a portion of the same LAN/WAN/INTERNET 102 network. Through these connections, teleconferencing controller 101 can communicate with these devices or systems.

Still referring to FIG. 1, it can be seen that a plurality of protocol converters 103 can also be connected to a portion of LAN/WAN/INTERNET 102, each through a data network path 107. Each protocol converter 103 handles the translation of signals and data formats between the selected VoIP (or similar) protocol and a telephony PSTN switch or PBX 104. Each protocol converter 103 communicates with its associated PSTN switch or PBX 104 through a telephony interface path 108. Note that while a one-to-one relationship is shown as an example in FIG. 1 between a protocol converter 103 and an associated PSTN switch or PBX 104, a single protocol converter 103 can communicate with more than one associated PSTN switch or PBX 104, and conversely a single PSTN switch or PBX 104 can communicate with more than one protocol converter 103.

Finally, in FIG. 1 it can be seen that each PSTN switch or PBX 104 communicates with each of a plurality of traditional voice telephones 105 through a switch-to-phone interface 109. This link represents any of the available well known standard telephony interfaces between switching systems and telephones as well as any privately held proprietary interface between a telephony switch and its associated telephone base.

It is important to note that while both VoIP (or similar) protocol phones and standard PSTN voice phones are shown in FIG. 1 to indicate that both can be accommodated simultaneously, the methods of the present invention are not limited to these specific protocols, and can be practiced using any one or more of the available communications protocols.

A software program 110, along with a conference call setup process 112 and one or more parallel connection processes 111, operates to control the actions of teleconferencing controller 101, actuating the methods, functions and features made available through practice of the present invention.

While one or more conferee lists 113 are stored in a data storage medium accessible to software program 110 operating on teleconferencing controller 101, these conferee lists 113 are not necessarily stored physically within the hardware of teleconferencing controller 101, since well known techniques in network technologies allow each of the lists to reside at any accessible network node. Each stored conferee list 113 defines the targeted conferees for a predefined conference call, along with detailed parameters related to each targeted conferee. Some or all of the conferee-specific elements shown in Table 1 are stored for each conferee in each stored conferee list 113.

TABLE 1

Contents of conferee list

| LIST ELEMENT | DESCRIPTION |
|---|---|
| Conferee ID | Used as a key to link connection statistics to this conferee. |
| Conference call ID list | A list of the IDs of conference calls to which this conferee is assigned. |
| Remote Cache | A network resource identifier that specifies where this conferee's data is locally stored. |
| Conferee name | The name of the person who is a target conferee. |
| Conferee language | The spoken language in which any interactive messages will be delivered to this conferee. |
| Message mask | A bitmapped filter that identifies which messages will be delivered to the target conferee under various circumstances. |
| Conferee telephone number | PSTN telephone number that will be used to contact conferee when using classic voice telephone connection. |
| Alternate telephone number | Alternate PSTN telephone number that can be used to contact this conferee. |
| Network address | The network address to use for connecting this conferee when using VoIP (or similar) protocol. |
| Preferred contact protocol | The preferred protocol (PSTN, VoIP, etc.) to use when contacting this conferee. |
| Preferred network | The preferred network to use when attempting to contact this conferee. |
| Preferred switch/PBX | The preferred telecommunications switch or PBX to use when attempting to contact this conferee. |
| Start time offset | The amount of time to delay an attempt to connect to this conferee. |

Conferencing Controller Software Overview

Figure 2:
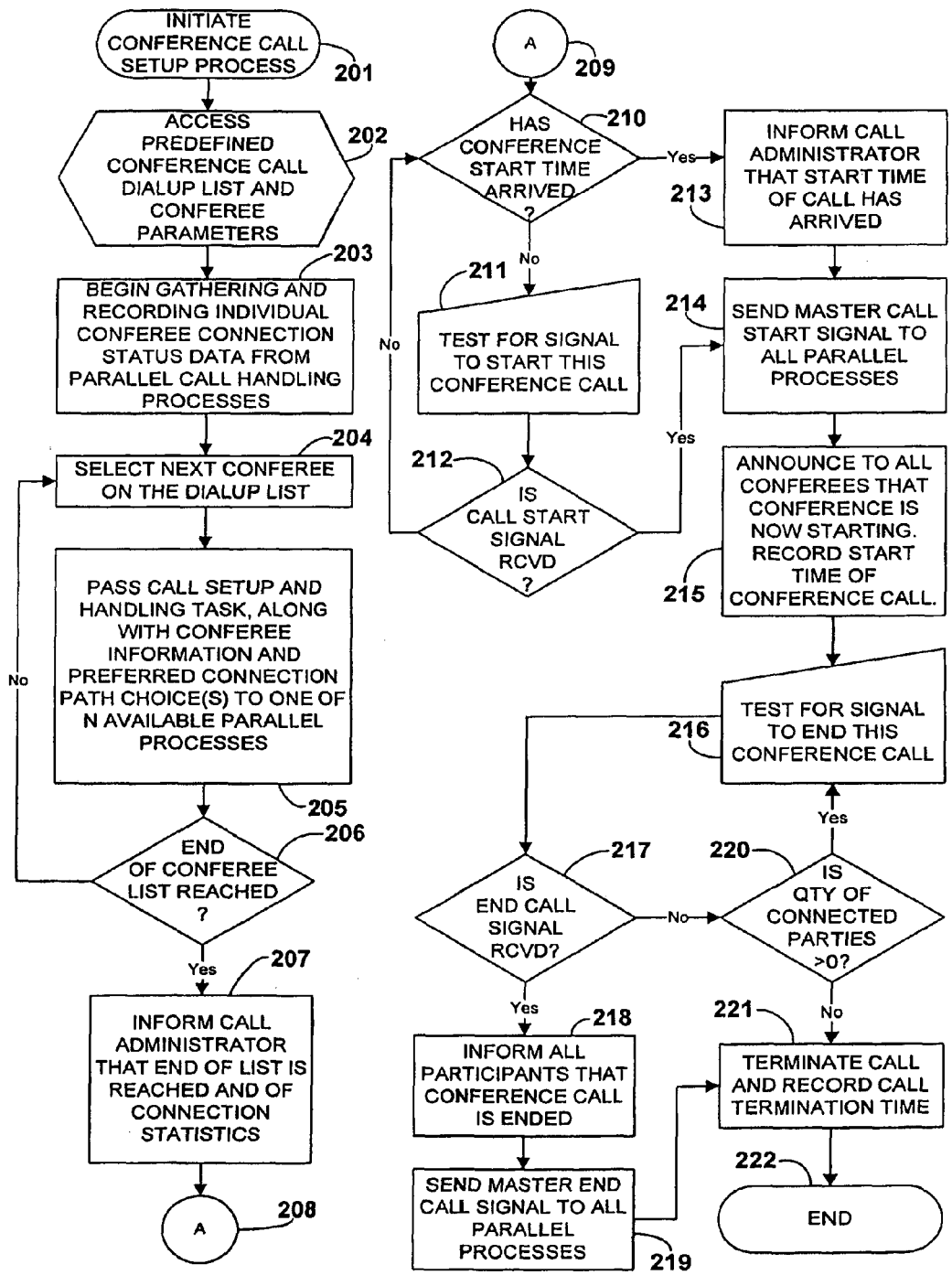
FIG. 2 is a simplified flow chart of the main loop of the controlling software program of the preferred embodiment of the invention.

Now referring the simplified software flowchart in FIG. 2 of the drawings, it can be seen that in the conference call setup process 112 of software program 110 (operating to control teleconferencing controller 101), there is a starting point block 201. At this point, software program 110 is already operating on teleconferencing controller 101, and there has been a trigger event or condition detected indicating that a conference call is to be initiated.

Since, to gain the claimed benefits of the present invention, the specific method of detecting and interpreting an initiating trigger event or condition and the specific method of identifying the applicable conferee list 113 is of no consequence, these details are omitted from this description of the invention. The present invention contemplates that any number of methodologies or approaches can be used as may be appropriate in particular situations. Generally, however, the present invention accommodates the initiating trigger and identification of the appropriate conferee list 113 in many forms. One example of this is the reception of a call from the conference call initiator that automatically identifies the caller (through the well known telephony "automatic number identifier" (ANI) signaling, or "caller ID" functionality), and thereby an associated conferee list 113. Alternately, a conference call can be triggered, and automatic selection of the associated conferee list 113 accomplished by computer software program 110 when it recognizes that a predefined call initiation time has arrived. Additionally, a user operating a network interface (traditionally, a web browser) can access an Internet or intranet web page where an option exists to trigger a conference call to any of a selection of conferee lists 113. The actions of the user of this web page are then communicated to software program 110 operating on teleconferencing controller 101, where the user's actions are interpreted as a trigger to initiate a conference call setup process 112 for the specified conferee list 113.

In the flowchart of FIG. 2 it can be seen that the beginning of conference call setup process 112 is starting point block 201, which connects to preparation block 202, where conference call setup process 112 accesses a pre-defined conferee list 113 that includes individual conferee parameters. Once conferee list 113 has been accessed, and the relevant data retrieved, conference call setup process 112 proceeds to process block 203 where conference call setup process 112 begins gathering and recording individual conferee connection status data from each of the parallel connection processes 111.

At this point, conference call setup process 112 enters a tight loop that includes process block 204, process block 205 and decision block 206. In this section of conference call setup process 112, the software steps sequentially through the entries of conferee list 113, and for each conferee on the list, assigns one of n available parallel connection processes 111 to manage establishment of maintenance of a connection to the selected conferee. In this manner, conference call setup process 112 is able to generate a simultaneous dial-out to some or all of the entries of conferee list 113 (since each of the assigned parallel connection processes 111 can proceed to connect to its assigned conferee without respect to any processing delays related to connection to any other target conferee).

Specifically, in process block 204, conference call setup process 112 selects the next conferee on the conferee list 113. Once this is accomplished (and the associated data has been acquired for the selected conferee), conference call setup process 112 proceeds to process block 205, where the call setup and handling for the selected conferee is passed to one of n available parallel connection processes 111. Along with this assignment, conference call setup process 112 passes to this instance of parallel connection process 111 any preferred connection path choices associated with the selected conferee that were retrieved from conferee list 113.

Once the call setup and handling for the selected conferee has been passed to an available parallel connection process 111, conference call setup process 112 proceeds to decision block 206, where a test is performed to determine whether the end of conferee list 113 has been reached. If the test shows that there are more entries of conferee list 113 yet to be processed, conference call setup process 112 returns to process block 204 for selection of the next conferee on the conferee list 113. Otherwise (all entries of the conferee list 113 have been processed), conference call setup process 112 proceeds to process block 207.

In process block 207, conference call setup process 112 informs the conference call administrator that the end of conferee list 113 has been reached. Process block 107 also makes available, to the conference call administrator, those connection statistics related to the call. These statistics may include information about how many conferees are currently connected, have accepted an invitation to the call and are waiting for the call to begin.

Once this is accomplished, conference call setup process 112 proceeds through connection point 208 and connection point 209 to decision block 210 where conference call setup process 112 enters a tight loop that includes decision block 210, manual input block 211 and decision block 212. In this loop, conference call setup process 112 monitors conditions to determine whether to begin the conference portion of the call.

Specifically, in decision block 210 conference call setup process 112 tests whether a predefined conference call start time has arrived. If this time has not arrived, conference call setup process 112 accepts any manual input signals that indicate whether a manual command to start the conference portion of the call has been received (for example, a traditional DTMF signal from one of the conferees or the call initiator). This test is accomplished in manual input block 216. Once this test is completed, conference call setup process 112 proceeds to decision block 217 where control of the program is returned to decision block 210 if such a manual command to start the conference portion of the call has not been received (thus returning to the top of this tight loop). However, if a manual command to start the conference portion of the call has been received, conference call setup process 112 proceeds to process block 214.

If in decision block 210 it is determined that a predefined start time for the conference call has arrived, conference call setup process 112 proceeds to process block 213, where the call administrator is informed that the start time for the call has arrived and the conference portion of the call is about to begin. Once this is done, conference call setup process 112 proceeds to process block 214, where a master call start signal is sent simultaneously to every parallel connection process 111, thus causing all conferees to enter the conference portion of the call. Once all connected conferees are placed in conference mode, conference call setup process 112 proceeds to process block 215, where an announcement is delivered simultaneously to all connected conferees that the conference call is now starting and the start time of the conference portion of the call is recorded.

At this point, conference call setup process 112 proceeds to manual input block 216, entering a tight loop comprised of manual input block 216, decision block 217 and decision block 221. In this loop, conference call setup process 112 monitors the conference call conditions to determine when the call has ended (or should end). In manual input block 216, a test is made to determine whether a signal has been received that commands conference call setup process 112 to end this conference call. The results of this test are evaluated in decision block 217, where, if the END CALL signal is received, conference call setup process 112 exits this loop and flows to process block 218, but if the END CALL signal is not received, conference call setup process 112 remains inside this loop, flowing to decision block 220.

Now following the flow of conference call setup process 112, when the results of the test are that the END CALL signal is received, the flow goes to process block 218, where all remaining conference call participants are notified that the conference call is ended. Proceeding on from there, process block 219 is entered, where a master END CALL signal is sent to each active parallel connection process 111, commanding each to disconnect its portion of the conference call. From here, conference call setup process 112 proceeds to process block 221, where the conference call is terminated (ended) and the termination time of the conference call is recorded, whereupon the main loop of conference call setup process 112 proceeds to process termination block 222, where conference call setup process 112 is terminated.

Now, instead, following the flow of conference call setup process 112, starting at decision block 217, when the results of the test are that the END CALL signal is not received, the flow goes to decision block 220, where it is determined whether more than zero conferees are still connected to the conference call. If there is a quantity greater than zero of conferees still connected to the call, then conference call setup process 112 reenters this loop by flowing into manual input block 216. If it is determined, however, in decision block 220 that there are zero conferees still connected to the conference call, then conference call setup process 112 exits this loop, flowing to process block 221, where the call is terminated (ended) and the termination time of the conference call is recorded, whereupon conference call setup process 112 proceeds to process termination block 222, where conference call setup process 112 is terminated.

Initiating A Call To A Conferee

Figure 2A:
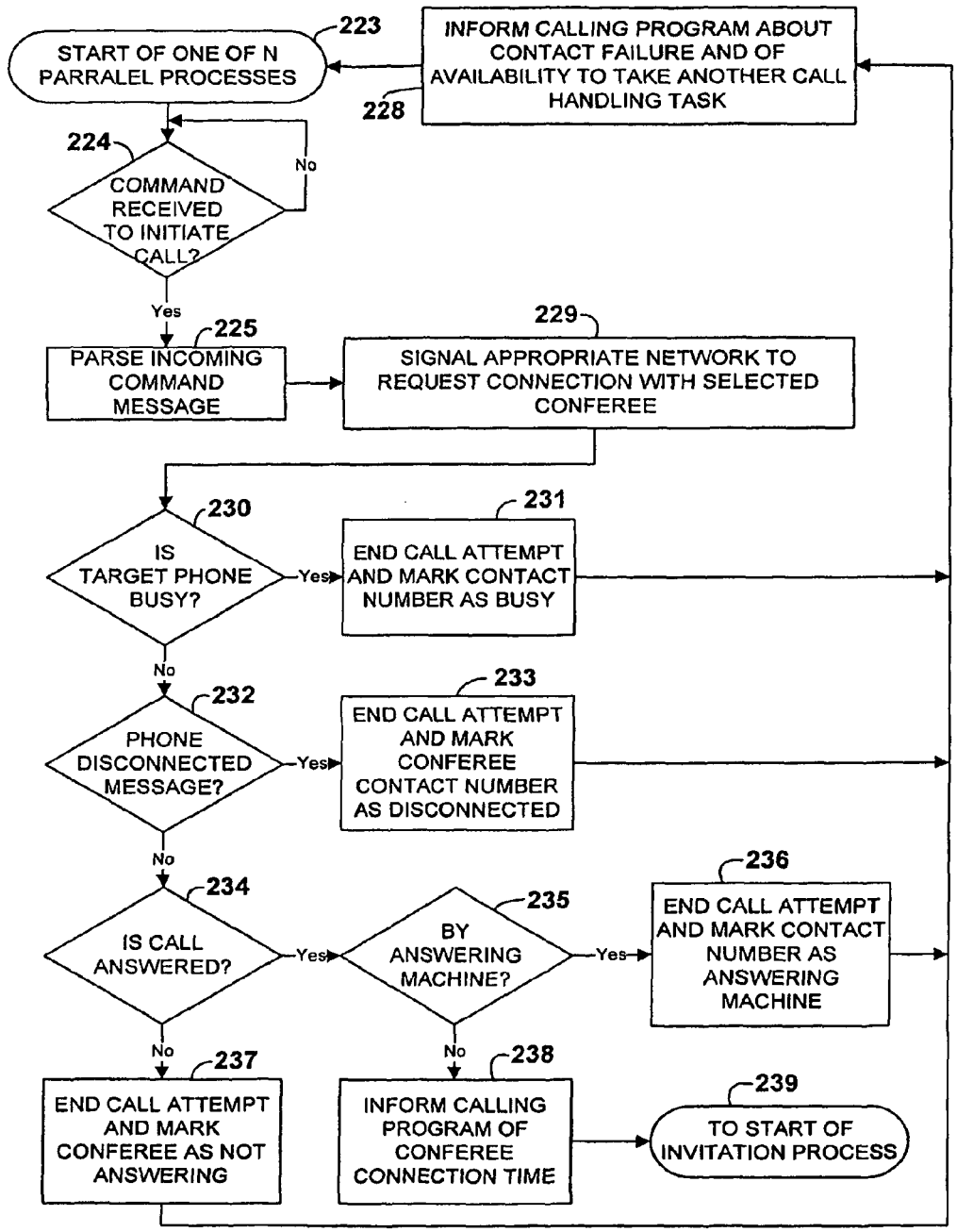
FIG. 2a is a simplified flow chart of one of n parallel conferee connection processes of the conferencing controller server software according to the preferred embodiment of the invention.

Now referring to FIG. 2a of the drawings, it can be seen that, from starting point, block 223, one of n identical parallel conferee connection processes 111 proceeds immediately to decision block 224. In decision block 224 it is determined whether a command has been received to initiate a call to a selected conferee from conferee list 113. Note that this instance of parallel conferee connection processes 111 is in communication with conference call setup process 112, from which this command to initiate a call is received.

If in decision block 224 it is determined that the command to initiate a call has not been received, the software re-enters decision block 224 remaining in a very tight loop (effectively continuously monitoring for the receipt of the command).

If the command to initiate a call is received, the software flows from decision block 224 to process block 225 where the received command data is parsed to retrieve the parameters related to the conferee that will be contacted. Refer to Table 1, for a list of parameters that can be stored for each conferee in conferee list 113.

From process block 225 the software proceeds to process block 229. In process block 229, the appropriate network is signaled (PSTN, VoIP, or any other type) to initiate a connection to the selected conferee (using the parameters acquired from conferee list 113) before the software flows to decision block 230.

Now in decision block 230 it is determined whether the target phone is 'busy'. If the target phone is busy, the software proceeds to process block 231 where the call attempt is ended and a statistic for this conferee is recorded that indicates that the conferee's phone was busy during the attempt to contact the conferee. From process block 231, the software flows to process block 228 where the calling program is informed about the contact failure and of the availability of this instance of one of n parallel conferee connection process 111 to accept another call handling task. From process block 228 the software returns to starting point block 223. If in decision block 230 it is determined that the target phone is not busy, the software proceeds to decision block 232.

In decision block 232 it is determined whether a 'phone disconnected' message is received during the attempt to contact the selected conferee. If a 'phone disconnected' message was received, the software proceeds to process block 233 where the call attempt is ended and a statistic for this conferee is recorded that indicates that a 'phone disconnected' message was received during the attempt to contact the conferee. From process block 233, the software flows to process block 228 where the calling program is informed about the contact failure and of the availability of this instance of one of n parallel conferee connection process 111 to accept another call handling task. From process block 228 the to software returns to starting point block 223. If in decision block 232 it is determined that a 'phone disconnected' message was not received, the software proceeds to decision block 234.

In decision block 234 it is determined whether the call was answered in response to the attempt to contact the selected conferee. If the call was not answered, the software proceeds to process block 237 where the call attempt is ended and a statistic for this conferee is recorded that indicates the call was not answered. From process block 237, the software flows to process block 228 where the calling program is informed about the contact failure and of the availability of this instance of one of n parallel conferee connection process 111 to accept another call handling task. From process block 228 the software returns to starting point block 223. If in decision block 234 it is determined that the call was answered, the software proceeds to decision block 235.

In decision block 235 it is determined whether the call was answered by an answering machine in response to the attempt to contact the selected conferee. If the call was answered by an answering machine, the software proceeds to process block 236 where the call attempt is ended and a statistic for this conferee is recorded that indicates the call was answered by an answering machine. From process block 236, the software flows to process block 228 where the calling program is informed about the contact failure and of the availability of this instance of one of n parallel conferee connection process 111 to accept another call handling task. From process block 228 the software returns to starting point block 223. If in decision block 235 it is determined that the call was not answered by an answering machine, the software proceeds to process block 238.

If the software enters process block 238, it indicates that a connection has been made and that the call has been answered by a person (not an answering machine). In process block 238 the calling program is informed of the time that the connection was made. From the software flows through connection point 239 and connection point 240 (shown in FIG. 2b), thereby entering the invitation process for this connection.

Invitation Process

Figure 2B:
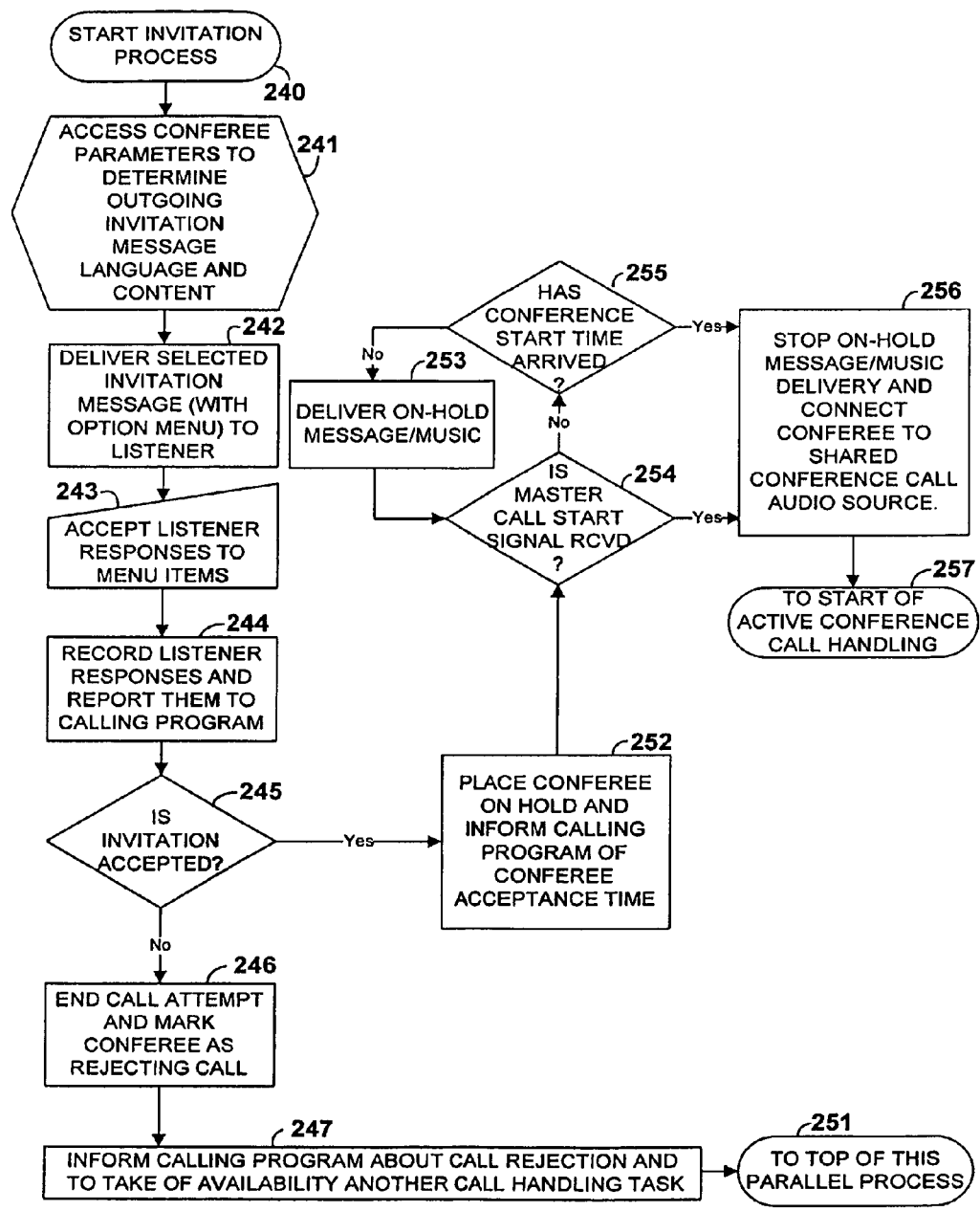
FIG. 2b is a simplified flow chart of the automatic invitation process of the conferencing controller server software according to the preferred embodiment of the invention.

Now referring to FIG. 2b of the drawings, it can be seen that connection point 240 is the starting point for the invitation process used by one of n parallel connection processes 111. From connection point 240 the software flows directly to preparation block 240, where data from conferee list 113 is accessed to determine the language and content of the outgoing message(s) that will be delivered to the selected conferee. Once this is accomplished the software proceeds to process block 242 where the selected spoken invitation is delivered to the listener (including an option menu). At this point the software proceeds to manual input block 243 where listener responses to the delivered menu are accepted.

Once the listener responses have been accepted, the software flows to process block 244, where the accepted responses are recorded and then reported back to the calling program. From process block 244, the software flows to decision block 245 where it is determined whether the invitation to the conference call has been accepted by the listener.

If the listener did not accept the invitation, the software proceeds to process block 246 where the call attempt is ended and a statistic is recorded that indicates that the conferee rejected the invitation to this conference call. From here, the software proceeds to process block 247 where the calling program is informed about the call rejection and of the availability of this instance of parallel connection process 111 to accept assignment to another connection attempt. Following this, the software proceeds through connection point 251 back to the top of the parallel process (connection point 223 shown in FIG. 2a).

If, in decision block 245, it is determined that the listener did accept the invitation, the software proceeds to process block 252 where the conferee is placed on hold and the calling program is informed of the acceptance time for this conferee. At this point the software proceeds to process block 254 where it is determined whether a master call start signal has been received. If a master call start signal has not been received, the software proceeds to decision block 255 where it is determined whether the conference start time has arrived. If the conference start time has not arrived, the software proceeds to process block 253, where an on-hold message or music is delivered to the conferee until the conference portion of the call begins.

Process block 253, decision block 254 and decision block 255 comprise a tight loop that continues until either a predetermined conference start time arrives or a master 'call start' signal is received. If either of these two conditions is met, the software proceeds to process block 256 where delivery of the on-hold message or music is stopped and the conferee is connected to the shared conference call audio source (thus joining the conference portion of the call).

From here the software proceeds through connection point 257 to connection point 258 (shown in FIG. 2c) where the active conference call handling process begins.

Active Conference Call Handling Process

Figure 2C:
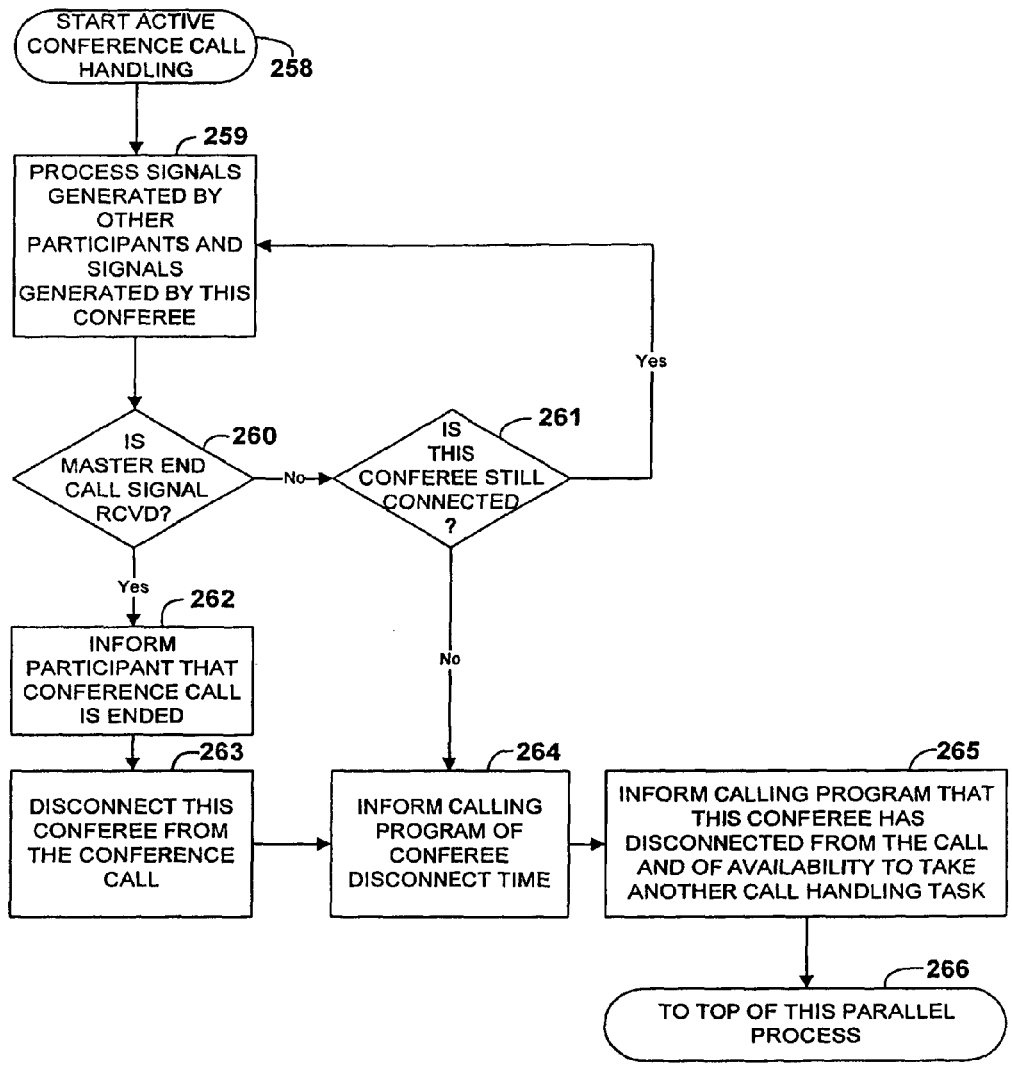
FIG. 2c is a simplified flow chart of the automatic active conference call handling process of the conferencing controller server software according to the preferred embodiment of the invention.

Now referring to FIG. 2c of the drawings, it can be seen that the active conference call handling process starts in connection point 258. From here the software proceeds immediately to process block 259 where the software continuously processes signals generated by other participants and signals generated by this conferee until the conference call is ended or the conferee disconnects from the call.

Process block 259 is part of a tight loop that includes decision block 260 and decision block 261. In this loop, if it is determined in decision block 260 that a master 'end call' signal has been received, the software flows to process block 262 where the conferee is informed that the conference call has ended. Once this has occurred, the software proceeds to process block 263 where this conferee is disconnected from the conference call. After disconnecting the conferee, the software proceeds to process block 264 where the calling program is informed of this conferee's disconnect time. From here, the software proceeds to process block 265 where the calling program is informed that this conferee has disconnected and this instance of parallel connection process 111 is available for accepting assignment of another call handling task.

If, during the processing of the tight loop comprised of process block 259, decision block 260 and decision block 261, it is determined in decision block 261 that the conferee is not still connected (the connection was accidentally lost or the conferee intentionally disconnected), the software proceeds to process block 264 and proceeds as described earlier.

Alternate Interconnection Of System Elements

Figure 3:
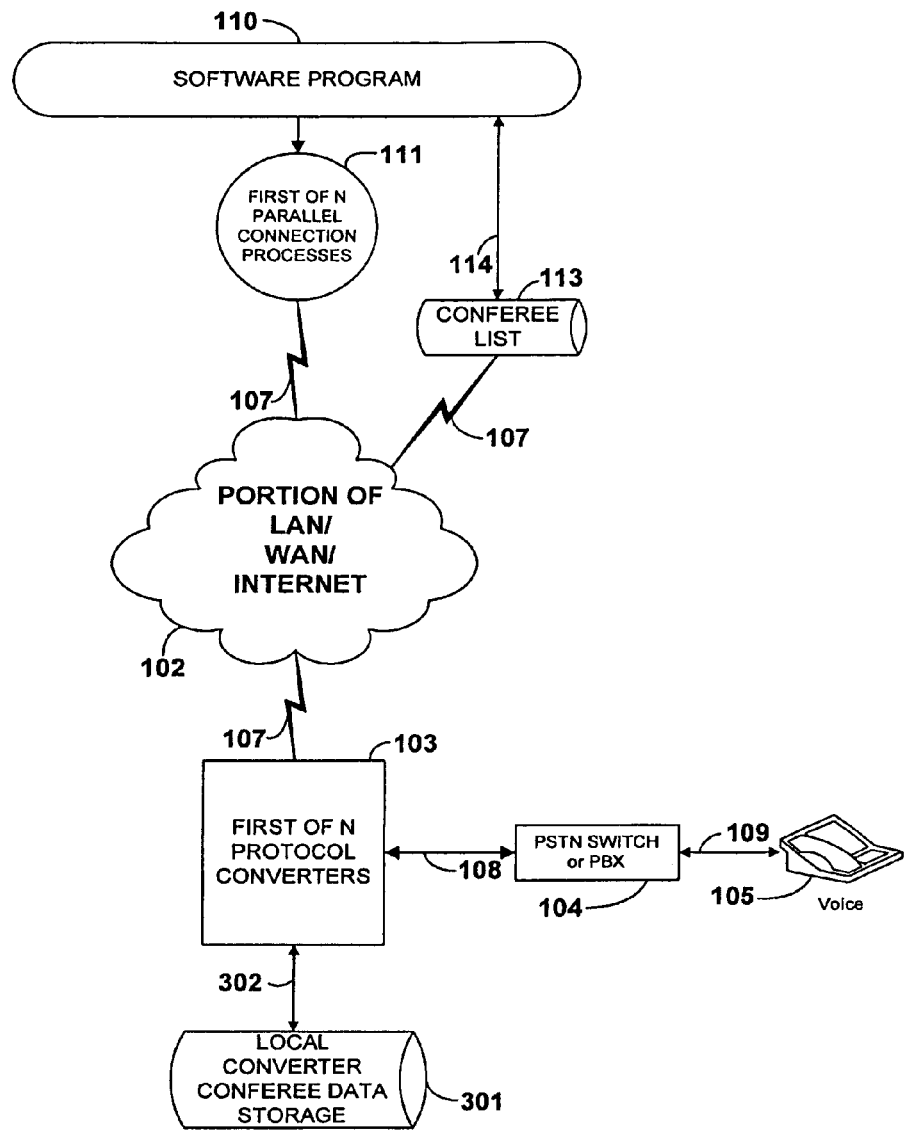
FIG. 3 is a simplified block diagram showing the interconnection of system elements according to an alternate embodiment of the invention.

Now referring to FIG. 3 of the drawings, it can be seen that, in an alternate embodiment of the invention, for any of n protocol converters 103, there are two new elements and one new communications path added to the architecture. These new elements enable protocol converter 103 to locally store (in local converter conferee data storage 301) some or all of the data contained in conferee list 113. Protocol converter 103 accesses data stored in local converter conferee data storage 301 via local storage access path 302.

In this embodiment of the invention conferee list 113 is accessed by protocol converter 103 through a portion of a LAN/WAN/INTERNET 102 network using an appropriate data protocol via instances of data network path 107.

In this arrangement, protocol converter 103 accesses conferee list 113 to acquire the data for one or more listed conferees. This data is stored in local converter conferee data storage 301 for later access. This distribution of data from conferee list 113 allows the parallel nature of the call setup process to become even broader. In this configuration, software program 110 can, through any of n parallel connection processes 111, send a single command to an instance of protocol converter 103, thereby causing that instance of protocol converter 103 to start its own internal process of performing a parallel connection effort to contact those conferees that are locally stored in local converter conferee data storage 301.

Because each instance of protocol converter 103 can have multiple instances of telephony interface path 108, though which communication is established with an instance of PSTN switch or PBX 104, protocol converter 103 can initiate multiple connection attempts in parallel. Thus, protocol converter 103 can convert protocol for multiple conversations occurring through each instance of PSTN switch or PBX 104 as it communicates with each traditional voice telephone 105 through a switch-to-phone interface 109.

Since, in this embodiment of the invention, protocol converter 103 already has a stored version of the information necessary to contact its pre-assigned list of conferees, parallel connection process 111 does not need to resend this information. Instead, a much shorter message is sent that provides a unique conference call identifier, triggering protocol converter 103 to start the internal process of establishing contact with those pre-assigned conferees that are associated with the specified conference call.

Software program 110 determines which instances of protocol converter 103 have a locally stored copy of data from conferee list 113 by accessing conferee list 113 through communications path 114, and then discovering which conferee records have a non-blank 'Remote cache' field. A non-blank 'Remote cache' field will contain the identity of the remote network resource where information about this conferee is stored (locally cached). In this manner, software program 110 can assemble a list of remote instances of protocol converter 103 that must be contacted and triggered with a short command when initiating a conference call. Of course this does not limit the ability of software program 110 to simultaneously utilize the same instance of protocol converter 103 for initiating individual connection attempts as is done in the preferred embodiment of this invention.

Using Connection Statistics

Figure 4:
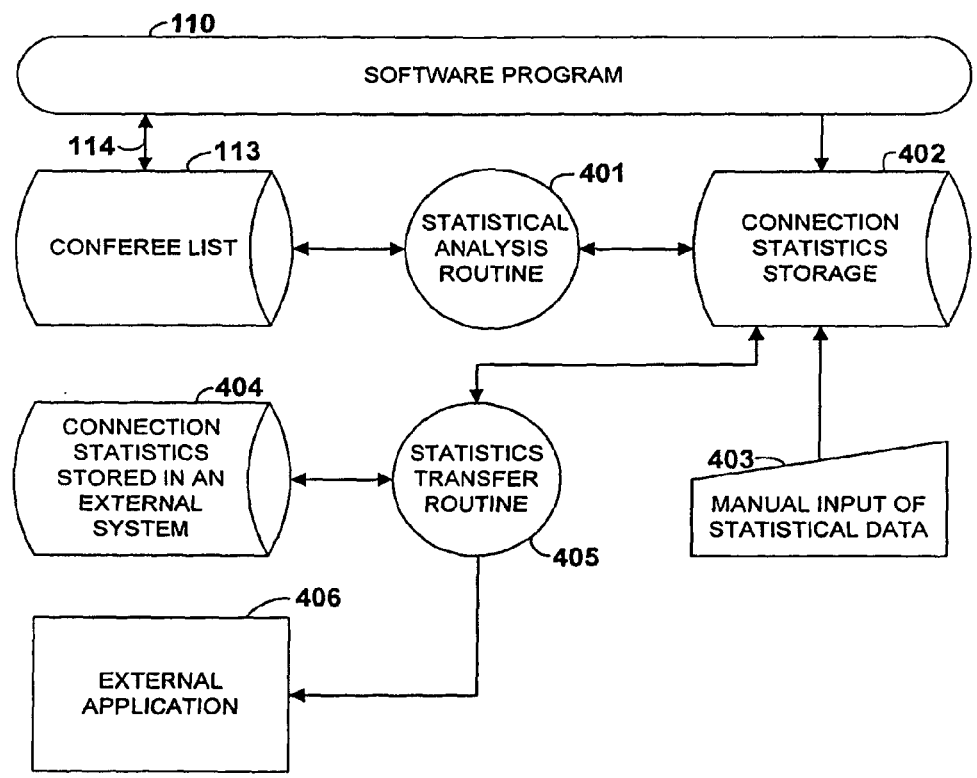
FIG. 4 is a simplified block diagram of the subsystem elements involved with using connection statistics according to the preferred embodiment of the invention.

Now referring to FIG. 4 of the drawings, it can be seen that the subsystem elements involved with using connection statistics are shown along with their interconnection scheme. This subsystem handles the acquisition and management of conference call connection statistics. Additionally, this subsystem contains statistical analysis routine 401, which analyzes the gathered statistics and uses the results of the analysis to modify the contents of conferee list 113. The changes made to conferee list 113 are intended to improve overall connection time coordination (minimizing the time that will elapse between connection of the first conferee to a conference call and the connection of the last conferee to the same call).

While minimizing the total time elapsed to connect all conferees to a call is important (and appropriately addressed by the present invention), it is also very important to insure that the first connectees to the conference call not be required to wait any longer than necessary for the conference portion of the call to start. Surprisingly, this may mean slowing down (increasing) connection times for specific conferees in order to insure that their actual connection time coincides with the connection times of other conferees. For instance, if the statistical information about conferee 'A' indicates that a connection to this conferee takes an average of 12 seconds, and the statistical information about conferee 'B' indicates that a connection to this conferee takes an average of 6 seconds, the connection attempt for conferee 'B' can be delayed by 6 seconds (relative to that of conferee 'A') to cause both conferees to be connected at the same time. As shown in Table 1 (contents of to conferee list), a "Start time offset" parameter is included for each conferee. This parameter can be modified as appropriate for each conferee on the list to best coordinate connection times.

Now referring once again to FIG. 4, it can be seen that communications between software program 110 and conferee list 113 occurs through communications path 114. During the conference call setup process, software program 110 accesses conferee list 113 to acquire, for each conferee on the list, the parameters related to making a connection with that conferee. Refer to Table 1 for a list of the preferred conferee parameters. These connection parameters are modified as necessary by the subsystem depicted in FIG. 4, based on the results of analysis of connection statistics gathered previously during the process of setting up conference calls involving conferees contained in conferee list 113.

Referring now to Table 2, a list of possible elements of statistical data that can be used by statistical analysis routine 401. These data, as well as others, can be used by the invention when analyzing the results of previous connection attempts to conferees.

TABLE 2

Connection Statistics

| STATISTICS ELEMENT | DESCRIPTION |
| --- | --- |
| Conferee ID | Links these statistics to a specific conferee. |
| Network used | The network that was used when contacting this conferee. |
| Protocol used | The protocol that was used when contacting this conferee. |
| Switch/PBX used | The switch or PBX that was used when contacting this conferee. |
| Phone number/ Network address | The telephone number or network address (for VoIP or similar connection) that was used when contacting this conferee. |
| Connection status | The status of the telecommunications connection attempt (did the selected network successfully connect to the target conferee's phone, or was a busy or other non-connect signal encountered?). |
| Connection time | The time that elapsed between the time that the selected network was sent the appropriate signals/data to initiate the connection and the time that the selected network signaled that a connection was established (phone is now ringing). |
| Ring time | The amount of time that the conferee's phone rang before being answered. |
| Call accepted? | Did the conferee accept the invitation to the conference call? |
| Conferee interaction time | The amount of time that elapsed while the conferee was responding to the automated invitation process. |

Now referring once again to FIG. 4, it can be seen that software program 110 sends statistical data related to each conference call to connection statistics storage 402. Statistical analysis routine 401 accesses connection statistics storage 402 to acquire historic statistical data for analysis.

Statistics storage 402 stores the statistical data in a format that is understood by software program 110. The statistical data stored in statistics storage 402 can come from sources other than software program 110. This subsystem accommodates the manual input of data 403, as well as automated importation of connection statistics stored in an external system 404. Through the use of statistics transfer routine 405 an automated process of converting externally sourced statistics into a format understandable by software program 110 is implemented. Statistics transfer routine 405 also stores the converted data in statistics storage 402. In this way, the advantages of the statistical analysis are expanded by allowing inclusion of statistical data from other sources.

Similarly, statistical data stored in statistics storage 402 can be exported to external system 404 through the use of statistics transfer routine 405.

As an additional benefit, the statistical data stored in statistics storage 402 can be converted to an appropriate format and exported to external applications 406 via statistics transfer routine 405. In this way, external systems can utilize the data for their own purposes.

Once a statistical analysis has been performed, and the entries in conferee list 113 have been modified, software program 110 will use the newer parameters contained in conferee list 113 when attempting to connect to any of the listed conferees.

Non-Hosting Conference Controller Arrangement

Figure 5:
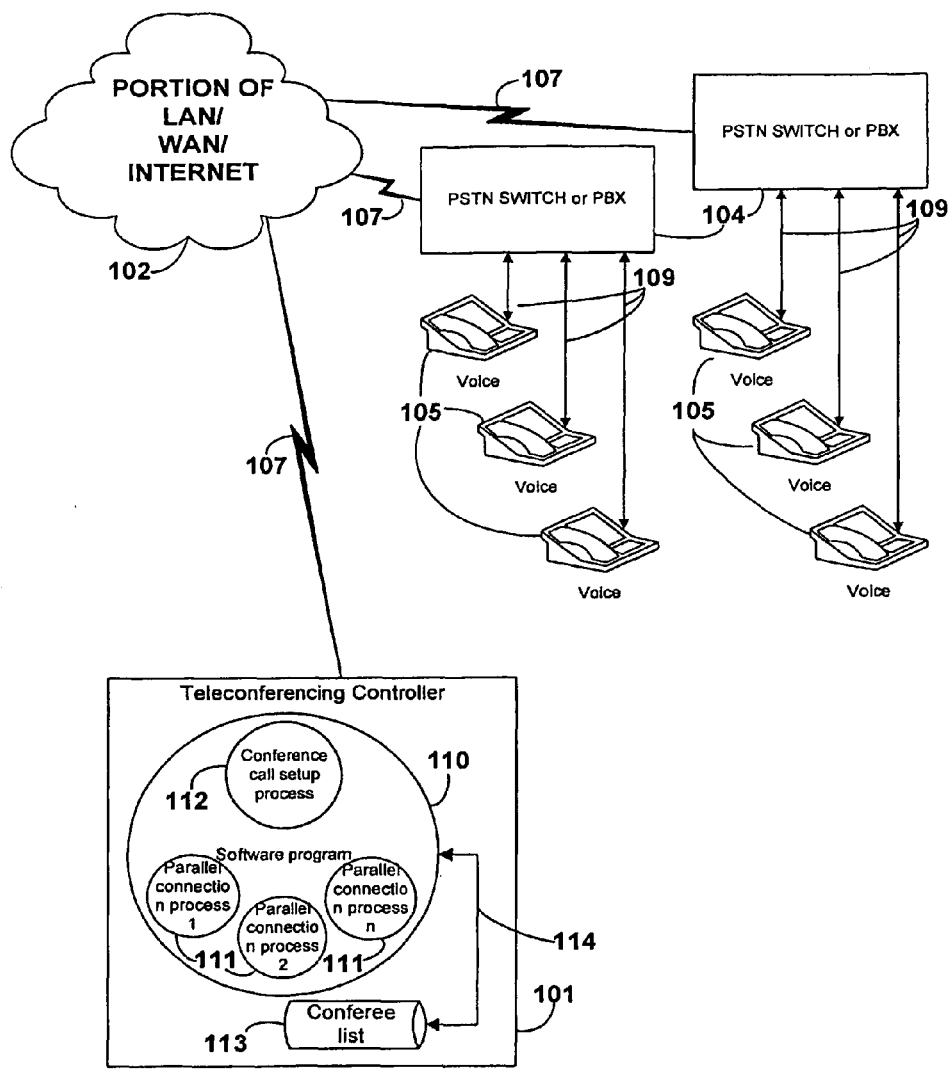
FIG. 5 is a simplified block diagram of an alternative arrangement of the invention's hardware architecture, where the conferencing controller does not host the conference call, and data connections to telephony switches are made directly, without involving VoIP gateways or protocol conversion of voice between VoIP and traditional telephony protocols.

Now referring to FIG. 5 of the drawings, it can be seen that, in an alternate embodiment of the invention, the requirement is eliminated for including a protocol converter 103 and telephony interface path 108 (both seen in FIG. 1 as elements of the hardware architecture of the preferred embodiment of the invention). Additionally, in this embodiment of the invention, teleconferencing controller 101 does not host the conference call. Instead, teleconferencing controller 101 simply sets up the call that will be hosted on another device (such as an instance of PSTN switch or PBX 104).

In the alternate embodiment of the invention depicted in FIG. 5, it can be seen that there is a software program 110 operating to control teleconferencing controller 101. Software program 110 contains conference call setup process 112, which is triggered when software program 110 detects a condition indicating that a conference call should be started. Additionally, software program 110 controls the existence and operation of all of n instances of parallel connection process 111. Available for access by software program 110 operating (and preferably residing within teleconferencing controller 101) is conferee list 113. Communications between software program 110 and conferee list 113 occurs through communications path 114.

Teleconferencing controller 101 is connected to, and communicates with, a portion of a LAN/WAN/INTERNET 102 network through a data network using an appropriate switch communications protocol via data network path 107. A plurality of PSTN switches or PBXs 104 is also connected to a portion of LAN/WAN/INTERNET 102, each through a data network path 107. Each PSTN switch or PBX 104 communicates with each of a plurality of traditional voice telephones 105 through a switch-to-phone interface 109. This link represents any of the available well known standard telephony interfaces between switching systems and telephones as well as any privately held proprietary interface between a telephony switch and its associated telephone base.

In the alternate embodiment of the invention depicted in FIG. 5, the communications protocol used between teleconferencing controller 101 and PSTN switch or PBX 104 accommodates teleconferencing controller 101 instructing PSTN switch or PBX 104 to initiate calls to specified PSTN telephones. Conferee list 113 is used by software program 110 to ermine which PSTN switch or PBX 104 is used to contact each listed conferee. In this embodiment of the invention, instead of only providing PSTN switch or PBX 104 with the connection information related to the target conferee, software program 110 also provides information that identifies where the conference call is being hosted, so PSTN switch or PBX 104 can establish a connection between the target conferee and the resource that is hosting the conference call.

Returning to FIG. 2C, step 259 illustrates processing signals generated by other participants.

After participant joins the conference call, he/she is placed in half-duplex listen only mode. At the same time system is ready to receive and react on signals generated by the participant's phone keypad.

If the signal is one of the known and expected by the system, the system will perform appropriate action associated with the signal. For example, user may be allowed to switch to full-duplex mode and be eligible to take active participation in the event like providing comments or asking the questions. As another example, user can be asked to vote on particular issue. People who agree have to press one (or any other predefined key which corresponds to YES), people who do not agree with the statement will press key associated with NO. There could be more answers than just YES and NO depending on the question and provided set of possible answers. The time devoted for the gathering responses could be limited on per question basis.

In a particular implementation, users are offered to press the pound key to ask the question. The amount of participants that can ask questions at the same time (full-duplex mode) is configured per call and currently is one. The rest are placed in waiting queue and will be allowed to ask the question in order they were placed.

The conference manager/provider can see how many people are in the queue, their basic information. The system also has ability to monitor the time during which each participant has full-duplex access and participate in the call. The event manager has also ability to remove participant from a queue or force out of active status.

The system also has the ability to register when user was already in full-duplex mode and prohibit the same user getting in that mode second time.

The system whispers the prompts before participants actually placed in full-duplex mode. It greatly reduces confusion when people do not know if they still are in passive waiting mode or already "on the air".

If the signal is unknown or unexpected by the system, it will be ignored and system will wait for the next signal.

Figure 6:
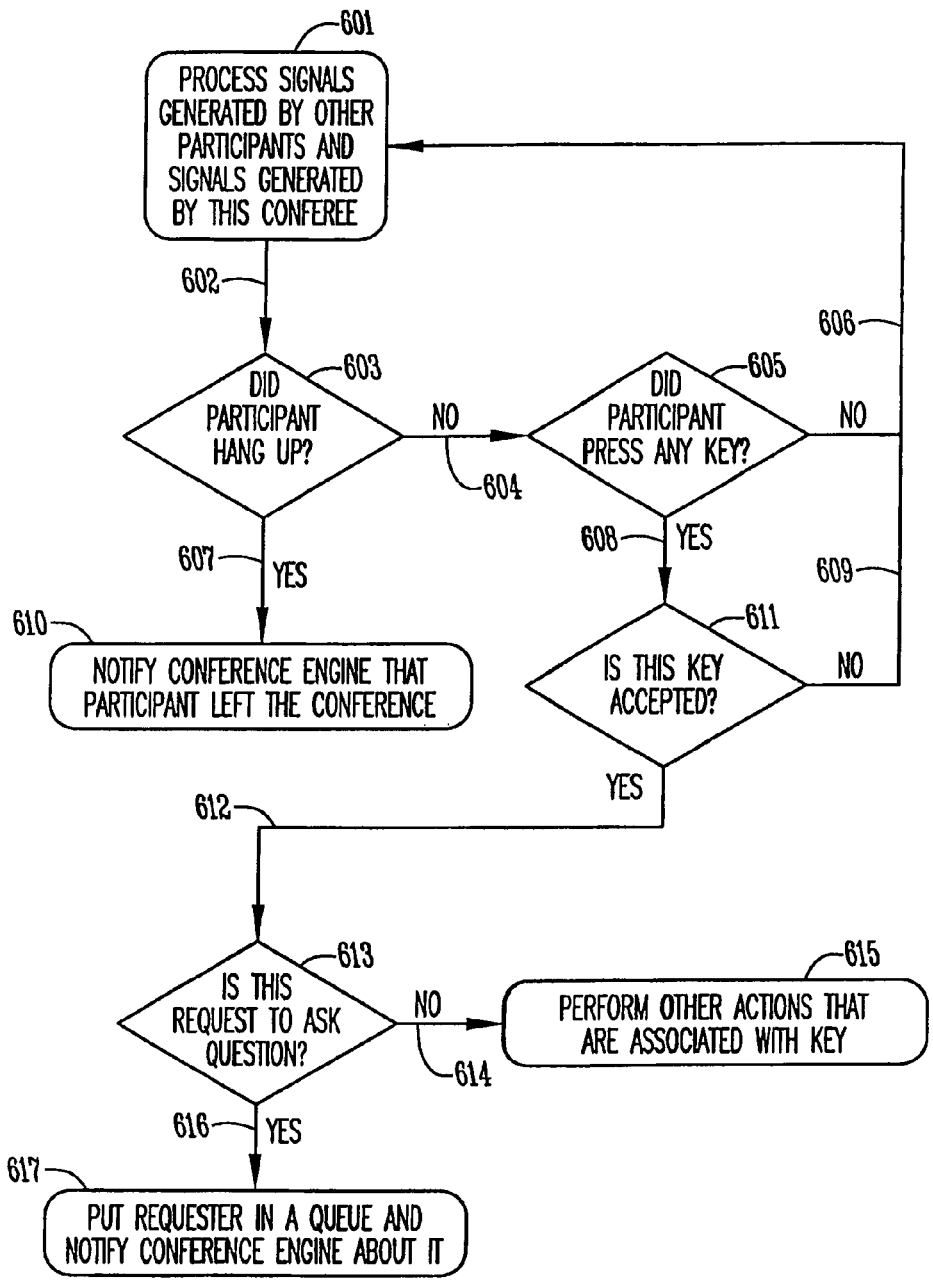
FIG. 6 is a flow diagram according to one embodiment of the present invention to show processing of signals from other participants within a conference call.

FIG. 6 provides more detailed description with respect to how actions from other participants are handled by the system. Based on action performed by the participant 600, the system makes a decision 603 of the next action that has to be performed. If participant hung up the phone 1076, then the system marks that participant is no longer active and registers information related to the fact that participant left the bridge 610. It includes but is not limited to registering statistical data related to the call and resource management.

If the participant still stays on the phone in step 604, the system analyses the generated input. If the participant pressed any key on a phone keypad 605, the system will perform action associated with the pressed key. If that action was not pressing the key, the system will return the participant to step 601 and will wait for new action. Currently only pressed key and hang up are actions are action analyzed by the system. The present invention, however, contemplate that other types of actions may also be analyzed.

If the action was a pressed key 605, the system will check if that key is currently associated with an action 611.

If the pressed key is not associated with any action currently expected by the system 609 the key will be ignored and system continues listening 601 for input from the participant.

If the pressed key is associated with the action currently expected by the system 612 the system will perform according to the request from participant 613. For example, if it was a request to ask the question 616 the participant will be placed in a block designed to handle questions from participants 617.
Strategy to Get More People on the Conference Bridge The present invention also contemplates that once a conference call has started, additional people can be added. It was found that amount of simultaneous dials per district has to be limited to avoid overloading local access and reduce total cost of operations. It means that instead of just dialing for two minutes and starting a conference call with the number of people who could be collected during that time, an alternative strategy allows for the benefits of beginning the conference call with a substantial number of participants and then continuing to add participants during the conference call. The methodology includes:

1. System starts mass out-dialing. When call is answered, system checks if it is a real person, fax or answering machine;
    a. Real person—plays invitation and offers to accept it or not.
    b. Fax machine—marks as a fax machine and hangs up.
    c. Answering machine—records appropriate message or hangs up.
2. After short period of time—2-3 minutes, "star" speaker joins the conference and starts his story.
3. System continues dialing. In most cases it changes prompt from "start shortly" to "joint in progress".
4. During dials some calls may fail. Depending on failure, the number will be called again. The examples are busy, no-answer. System may call the same number more than twice.
5. After calling list is completed with all possible redial cases, or some predefined time before end of planned conference call (whatever happened first) system stop dialing process.

Figure 7:
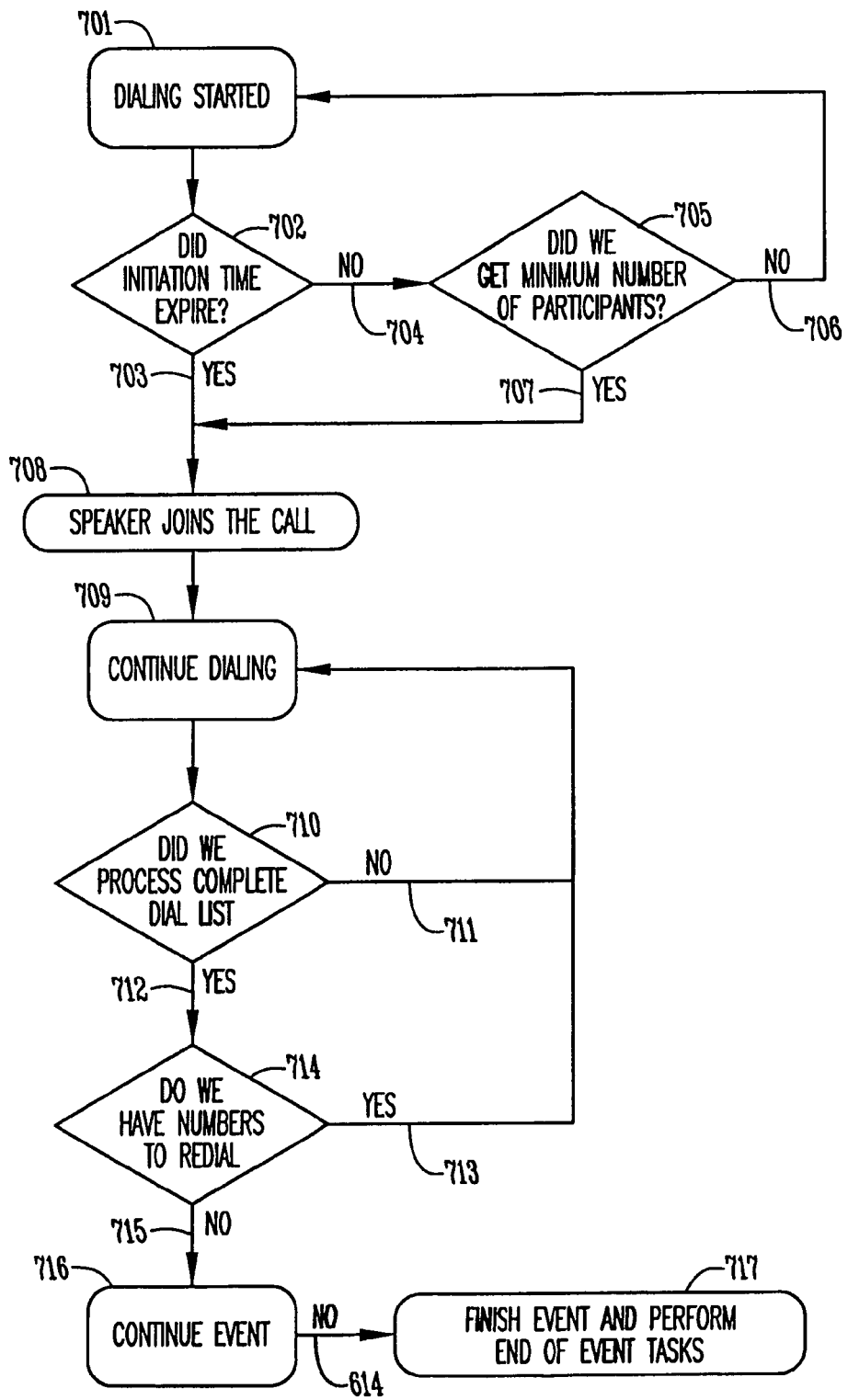
FIG. 7 is a flow diagram according to another embodiment of the present invention to show the strategy used to involve more people in an event.

One embodiment of a process for involving more people in the event is shown in FIG. 7. As shown in FIG. 7, after dialing started 701 system check if original minimum time for the startup dialing 702 expires. If not, it checks if we got minimum amount of participants for speaker to join the event. If start timeout didn't expire and minimum amount of participants was not reached, system continues dialing 701 till any of the events 702 or 705 occurs.

As soon as any of events 702 or 705 occurs, speaker joins the event 708. Other conditions can be added to the check to trigger speaker participation. After speaker joins the event, the system continues dialing 709. That process will continue until we process all list 710 have been called and there are no more numbers to redial 714. It is possible that system finishes dialing before speaker joins the event. This may occur in cases when the system completes the dial list in a very short time for example. After all numbers are dialed the event may continue 716 for some time.

Expand Audience of Participants by Deploying Different Mass-Media Services

The present invention also contemplates that mass-media services can be used for expanding the size of an audience. The actual call may be of interest to more people than were actually included in the dialing list. To expand the potential audience, the system has the capability of broadcasting the event over the Web; Radio or any other broadcast media system. As a simple solution, the system can out dial a provided phone number that is connected to a broadcast system.

The system can also provide dial-in number, so people who missed the original call or were listening over third party broadcast media service (radio for example) have an opportunity to join the call from the phone and ask the speaker a question or otherwise actively participate in the conference call.

Figure 8:
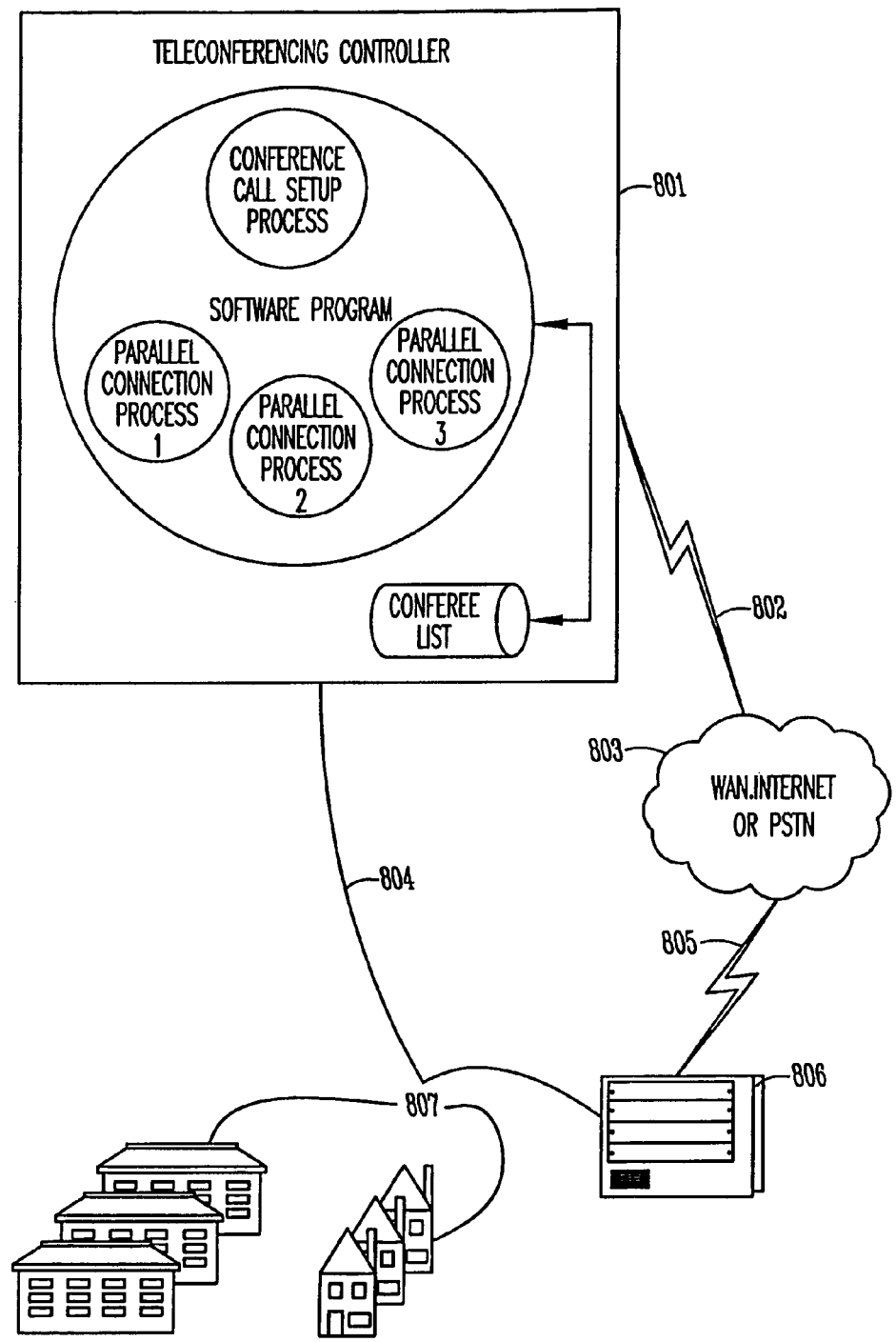
FIG. 8 is a block diagram of a system according to one embodiment of the present invention to show expanding an audience.

FIG. 8 provides additional details about an embodiment for expanding the audience beyond the provided dial list. In FIG.

8, the teleconferencing controller 801 is connected over WAN 802, 803 to the mass broadcast system 806. A regular telephone system (PSTN) or Internet or some proprietary wide area data network 803 is connected 802 to a teleconferencing controller. A Mass Broadcast System 806 is connected 805 to the same controller over the same network 803. The Mass Broadcast System can be, without limitation, a radio broadcast system, a TV broadcast system, and a web broadcast system.

The main conferencing event is sent over the connection 802, 803, and 805 to the Mass Broadcast System 806 which retransmits it to multiple recipients 807. At the same time multiple recipients have the ability to dial phone number(s) and join conference 804 directly. That connection is similar to one that is provided to people that join during out dialing process.

Therefore a system and process for a mass telephony conference call has been described. That which has been described is merely exemplary. It is clear, however, that the present invention provides for numerous different features to provide for mass conferencing call. Of course, the present invention contemplates numerous variations in specific structure and methodology.

What is claimed is:

1. A method for automated conferencing, which initiates a conference call, that reduces conference call setup time, comprising:
    using an automated conference call system to assign one of n available parallel connection processes to manage establishment of maintenance of a connection to a selected conferee from a plurality of n selected conferees;
    simultaneously initiating connection attempts by outdialing, using said automated conference call system, to said plurality of n selected conferees, wherein each of the connection attempts is routed through a corresponding one of the n available parallel connection processes using separate available parallel telecommunication connection resources selected from a plurality of parallel telecommunication resources of said automated conference call system, so as to carry out a simultaneous, parallel outdialing to n selected conferees, without waiting for connection to a selected conferee before proceeding to out-dialing other of said plurality of n selected conferees;
    wherein for each connection attempt resulting in an answered call, using said automated conference call system to determine when the answered call is answered by one of a person, a fax machine, or an answering machine;
    using said automated conference call system to automatically initiate the conference call when said automated conference call system has determined that a minimum number of n selected conferees have joined the conference call;
    using said automated conference call system to redial failed calls and continue to initiate connections to other n selected conferees during the conference call; and
    adding a speaker to the conference call, using said automated conference call system, after said minimum number of n selected conferees have joined said conference call.

2. The method of claim 1 further comprising broadcasting the conference call.

3. The method of claim 2 further comprising:
    providing a dial-in number for a conferee to attend the conference call via the broadcasting.

4. The method of claim 2 wherein the broadcasting is broadcast over a computer network.

5. The method of claim 2 wherein the broadcasting is broadcast over radio.

6. The method of claim 2, wherein said failed calls include busy and no-answer calls.

7. The method of claim 1, further comprising:
    wherein when said answered call is answered by the person, then playing an invitation to the conference call;
    wherein when the answered call is answered by the fax machine, then ending the connection attempt; and
    wherein when the answered call is answered by the answering machine, then recording a message or ending the connection attempt.

8. The method of claim 1, wherein said automated conference call system calls a same number more than twice.

9. The method of claim 1, further comprising:
    stopping said redialed calls when one of all redial numbers are called, or a predefined time before an end of the conference call has expired.

10. A method for automated conferencing, which initiates a conference call, that reduces conference call setup time, comprising:
    using an automated conference call system to assign one of n available parallel connection processes to manage establishment of maintenance of a connection to a selected conferee from a plurality of n selected conferees;
    simultaneously initiating connection attempts by outdialing, using said automated conference call system, to said plurality of n selected conferees, wherein each of the connection attempts is routed through a corresponding one of the n available parallel connection processes using separate available parallel telecommunication connection resources selected from a plurality of parallel telecommunication resources of said automated conference call system so as to carry out a simultaneous, parallel outdialing to n selected conferees, without waiting for connection to a selected conferee before proceeding to out-dialing other of said plurality of n selected conferees;
    wherein for each connection attempt resulting in an answered call, using said automated conference call system to determine when the answered call is answered by one of a person, a fax machine, or an answering machine;
    using said automated conference call system to automatically initiate the conference call when said automated conference call system has determined that a minimum number of n unlimited selected conferees have joined the conference call;
    using said automated conference call system to redial failed calls and continue to initiate connections to other n selected conferees during the conference call;
    using said automated conference call system to check when a predefined time for starting dialing said n selected conferees has expired; and
    adding a speaker to the conference call, using said automated conference call system, when said minimum number of n selected conferees have joined the conference call, or when said predefined time for starting said dialing said n selected conferees has expired.

11. The method of claim 10, wherein said out dialing and redialing steps are completed before the speaker joins said conference call.

12. An automated conferencing call system which initiates a conference call, that reduces conference call setup time, comprising:
- a conferencing controller comprising at least one memory containing at least one program; and
- a processor for executing the program,
  - wherein, using the automated conference call system, the processor assigns one of n available parallel connection processes to manage establishment of maintenance of a connection to a selected conferee from a plurality of n selected conferees;
  - wherein the processor simultaneously initiates connection attempts by outdialing, using the automated conference call system, to said plurality of n selected conferees, wherein each of the connection attempts is routed through a corresponding one of the n available parallel connection processes using separate available parallel telecommunication connection resources selected from a plurality of parallel telecommunication resources of the automated conference call system, so as to carry out a simultaneous, parallel outdialing to n selected conferees, without waiting for connection to a selected conferee before proceeding to out-dialing other of said plurality of n selected conferees;
  - wherein for each connection attempt resulting in an answered call, the processor determines when the answered call is answered by one of a person, a fax machine, or an answering machine;
  - wherein the processor automatically initiates the conference call when said automated conference call system has determined that a minimum number of n selected conferees have joined the conference call;
  - wherein the processor redials failed calls and continues to initiate connections to other n selected conferees during the conference call; and
  - wherein the processor adds a speaker to the conference call after said minimum number of n selected conferees have joined said conference call.

13. A non-transitory computer readable medium whose contents cause a computer system to execute instructions of a program, the program comprising the steps of:
- using an automated conference call system to assign one of n available parallel connection processes to manage establishment of maintenance of a connection to a selected conferee from a plurality of n selected conferees;
- simultaneously initiating connection attempts by outdialing, using said automated conference call system used to initiate a conference call, to said plurality of n selected conferees, wherein each of the connection attempts is routed through a corresponding one of the n available parallel connection processes using separate available parallel telecommunication connection resources selected from a plurality of parallel telecommunication resources of said automated conference call system, so as to carry out a simultaneous, parallel outdialing to n selected conferees, without waiting for connection to a selected conferee before proceeding to out-dialing other of said plurality of n selected conferees;
- wherein for each connection attempt resulting in an answered call, using said automated conference call system to determine when the answered call is answered by one of a person, a fax machine, or an answering machine;
- using said automated conference call system to automatically initiate the conference call when said automated conference call system has determined that a minimum number of n selected conferees have joined the conference call;
- using said automated conference call system to redial failed calls and continue to initiate connections to other n selected conferees during the conference call; and
- adding a speaker to the conference call, using said automated conference call system, after said minimum number of n selected conferees have joined said conference call.

* * * * *